(12) United States Patent
Jungeberg

(10) Patent No.: US 9,157,471 B2
(45) Date of Patent: Oct. 13, 2015

(54) FRICTION LOCKING SPHERICAL JOINT

(71) Applicant: Kenneth Alvin Jungeberg, Liberty Township, OH (US)

(72) Inventor: Kenneth Alvin Jungeberg, Liberty Township, OH (US)

( * ) Notice: Subject to any disclaimer, the term of this patent is extended or adjusted under 35 U.S.C. 154(b) by 0 days.

(21) Appl. No.: 13/625,915

(22) Filed: Sep. 25, 2012

(65) Prior Publication Data

US 2013/0077904 A1    Mar. 28, 2013

Related U.S. Application Data

(60) Provisional application No. 61/539,032, filed on Sep. 26, 2011.

(51) Int. Cl.
| | | |
|---|---|---|
| *F16C 11/08* | (2006.01) | |
| *F16C 11/06* | (2006.01) | |
| *F16C 11/10* | (2006.01) | |

(52) U.S. Cl.
CPC ......... *F16C 11/0614* (2013.01); *F16C 11/0604* (2013.01); *F16C 11/0685* (2013.01); *F16C 11/0695* (2013.01); *F16C 11/106* (2013.01); *Y10T 29/49647* (2015.01)

(58) Field of Classification Search
CPC .............. F16C 11/08; F16B 2/02; F16B 2/06; F16B 7/1418
USPC ......... 403/192, 194, 196, 223, 225, 365, 372, 403/289, 290
See application file for complete search history.

(56) References Cited

U.S. PATENT DOCUMENTS

| | | | |
|---|---|---|---|
| 1,590,204 A | | 6/1926 | Powell |
| 2,404,385 A | * | 7/1946 | Fritts .............................. 403/336 |
| 2,711,352 A | | 6/1955 | Hasko et al. |
| 2,785,022 A | | 3/1957 | Lakey et al. |
| 3,539,208 A | | 11/1970 | Brooklyn et al. |
| 3,539,234 A | * | 11/1970 | Rapata .......................... 384/203 |
| 3,550,636 A | | 12/1970 | Hearne et al. |
| 3,768,879 A | | 10/1973 | Dee |
| 3,776,649 A | | 12/1973 | Kemezys |
| 3,960,416 A | | 6/1976 | McCloskey |
| 4,025,214 A | * | 5/1977 | Spieth .......................... 403/370 |
| 4,105,261 A | | 8/1978 | Myers et al. |
| 4,248,486 A | | 2/1981 | Bradley, Jr. |
| 4,357,651 A | * | 11/1982 | Mayer .......................... 362/275 |
| 4,673,376 A | | 6/1987 | Fender |
| 4,753,462 A | * | 6/1988 | Liu ............................... 285/420 |
| 4,980,805 A | * | 12/1990 | Maglica et al. ............... 362/191 |
| 5,184,884 A | * | 2/1993 | Maglica et al. ............... 362/191 |
| 5,270,911 A | * | 12/1993 | Maglica et al. ............... 362/396 |
| 5,351,980 A | * | 10/1994 | Huang ........................ 280/281.1 |
| 5,515,246 A | * | 5/1996 | Maglica ........................ 362/473 |
| 5,660,363 A | * | 8/1997 | Maglica .................... 248/288.31 |
| 5,667,185 A | * | 9/1997 | Maglica ........................ 248/541 |
| 5,842,385 A | * | 12/1998 | Su ................................ 74/551.3 |

(Continued)

*Primary Examiner* — Daniel P. Stodola
*Assistant Examiner* — Daniel Wiley
(74) *Attorney, Agent, or Firm* — John B. Woodard; Jon L. Woodard; Woodard International Law

(57) ABSTRACT

A spherical bearing permits alignment, maintained alignment, and the immobilization of an attachment to a shaft passing through a core of a bearing. The bearing includes a spherical inner core surrounded by a housing around the core. The bearing does not require alignment of the housing and core to perform its function. Design features based on structural modification of the inner core allow the bearing to be immobilized using minimal compression and releasability when the bearing is released.

10 Claims, 6 Drawing Sheets

(56) References Cited

U.S. PATENT DOCUMENTS

| | | | |
|---|---|---|---|
| 5,860,728 A * | 1/1999 | Maglica | 362/191 |
| 6,167,780 B1 * | 1/2001 | Chen | 74/551.1 |
| 6,186,027 B1 * | 2/2001 | Nielsen | 74/551.1 |
| 6,325,544 B1 | 12/2001 | Sasaki et al. | |
| 6,368,321 B1 | 4/2002 | Jackson | |
| 6,742,750 B2 | 6/2004 | Burr | |
| 6,860,638 B2 | 3/2005 | Fish | |
| 6,913,410 B2 | 7/2005 | Blanke | |
| 6,988,696 B2 * | 1/2006 | Attee | 248/214 |
| 7,037,022 B2 | 5/2006 | Schonhoff et al. | |
| 7,246,781 B2 | 7/2007 | Nam | |
| 7,300,210 B2 * | 11/2007 | Johnson et al. | 384/537 |
| 7,699,332 B2 * | 4/2010 | Lai | 280/279 |
| 2002/0037117 A1 | 3/2002 | Sasaki et al. | |
| 2002/0097932 A1 | 7/2002 | Roberts et al. | |
| 2005/0036722 A1 | 2/2005 | Sasaki et al. | |
| 2009/0096185 A1 * | 4/2009 | Wu et al. | 280/279 |
| 2010/0125302 A1 | 5/2010 | Hammill, Sr. | |

* cited by examiner

FRICTION LOCKING SPHERICAL JOINT

CROSS REFERENCE TO RELATED APPLICATION

This application claims the benefit of U.S. Provisional Patent Application No. 61/539,032, filed Sep. 26, 2011.

BACKGROUND OF THE INVENTION

When working with mechanical apparatus, it is often desirable to connect an element of the apparatus or the entire apparatus to a shaft. The connected shaft can arise from nearly any source and be any shaft from a free standing or floating shaft to a securely positioned shaft specifically designed for mounting an apparatus. The shaft can even be an element of another apparatus.

Depending on the mechanical situation, it is often desirable not only to make a connection to a shaft but to lock whatever is connected to the shaft in a particular orientation with respect to the shaft at least temporarily. Subsequently, it can become desirable to change the orientation of the connected or mounted element. To do this various kinds of locking devices have been provided in the past which can be locked in place and released for adjustment.

In general the state of the art for rotating and then locking a device at any point along a shaft is to use three separate mechanisms: one that allows translation along and rotation about the shaft, and two others that allow rotation about two mutually perpendicular axes that are themselves perpendicular to the axis of the shaft.

The complexity and size of an assembly of mechanisms to do this, along with the inefficiency of having to orient and then lock three mechanisms to achieve a particular position or orientation is cumbersome at best and can be frustrating for the operator as the operator attempts to align a connection in a three dimensional space. A single mechanism that concurrently allows rotation about all three axes and translation along the axis of the shaft in a single motion and is then fixed in place by a single locking motion is sometimes used.

Commonly, such a solution would use a spherical alignment bearing or joint with the bearing housing and the spherical core both split and would incorporate a clamping mechanism on the housing to tighten the housing on the core and consequently the core on the shaft. However, to achieve maximum clamping pressure of the bearing on the shaft, the split in the housing and the split in the core need to be aligned in substantially the same plane.

This again makes such a system difficult to use causing frustration by the user and unreliable clamping with variable clamping forces needed depending on how the core is aligned with the clamp. A better method is needed for clamping releasably, reliably and adjustably while aligning and maintaining alignment of the apparatus that is being clamped and positioned together without the need to focus on alignment of the elements comprising the core and clamping mechanism.

BRIEF DESCRIPTION OF THE INVENTION

A spherical bearing for releasably immobilizing an attachment to a shaft is provided. The spherical bearing comprises a truncated flexible spherical core with an annular hole through the center of the spherical core for appending the core on the shaft. Segments around the spherical core are created by relief cuts in the spherical core, and deflection flexure points displaced from the annular hole are formed by the relief cuts in the core.

A housing surrounds the spherical core. The housing is designed to compress the core when a releasable clamping mechanism is applied to the housing. The clamping mechanism causes the segments of the core to deflect about the deflection flexure points toward the shaft immobilizing the core on the shaft and immobilizing the housing on the core.

A method for releasably immobilizing an attachment to a shaft is provided. The method comprises providing a truncated spherical core for a spherical bearing and boring an annular hole through the center of the core. Segments are created around the spherical core by making relief cuts in the core and arranging the relief cuts to provide deflection flexure points displaced from the annular hole.

A housing is provided that surrounds the spherical core and comprises a clamping mechanism for compressing the spherical core. An attachment is appended to the housing, and the shaft is disposed in the annular hole. The housing and the spherical core are compressed using the clamping mechanism. The clamping pressure deflects the segments about the deflection flexure points toward the shaft immobilizing the core on the shaft, the housing on the core and the attachment on the housing. Releasing the clamping mechanism releases the immobilization of the attachment when mobility of the attachment is desired.

DETAILED DESCRIPTION OF THE INVENTION

A spherical bearing, sometimes called a spherical joint, is provided that permits not only ease of alignment but also easily maintained alignment when releasably immobilizing an attachment to a shaft. The joint comprises a spherical inner core which is surrounded by a housing around the core. The joint apparatus does not require careful alignment of the housing and core to efficiently perform its function. To overcome the problem of maintaining alignment and/or immobilization of the item attached to the bearing, the spherical inner core is modified with a series of structural modifications called relief cuts to assure maximum immobility when the bearing or joint is clamped on the shaft regardless of the orientation of the core relative to the clamp housing.

Figure 1:
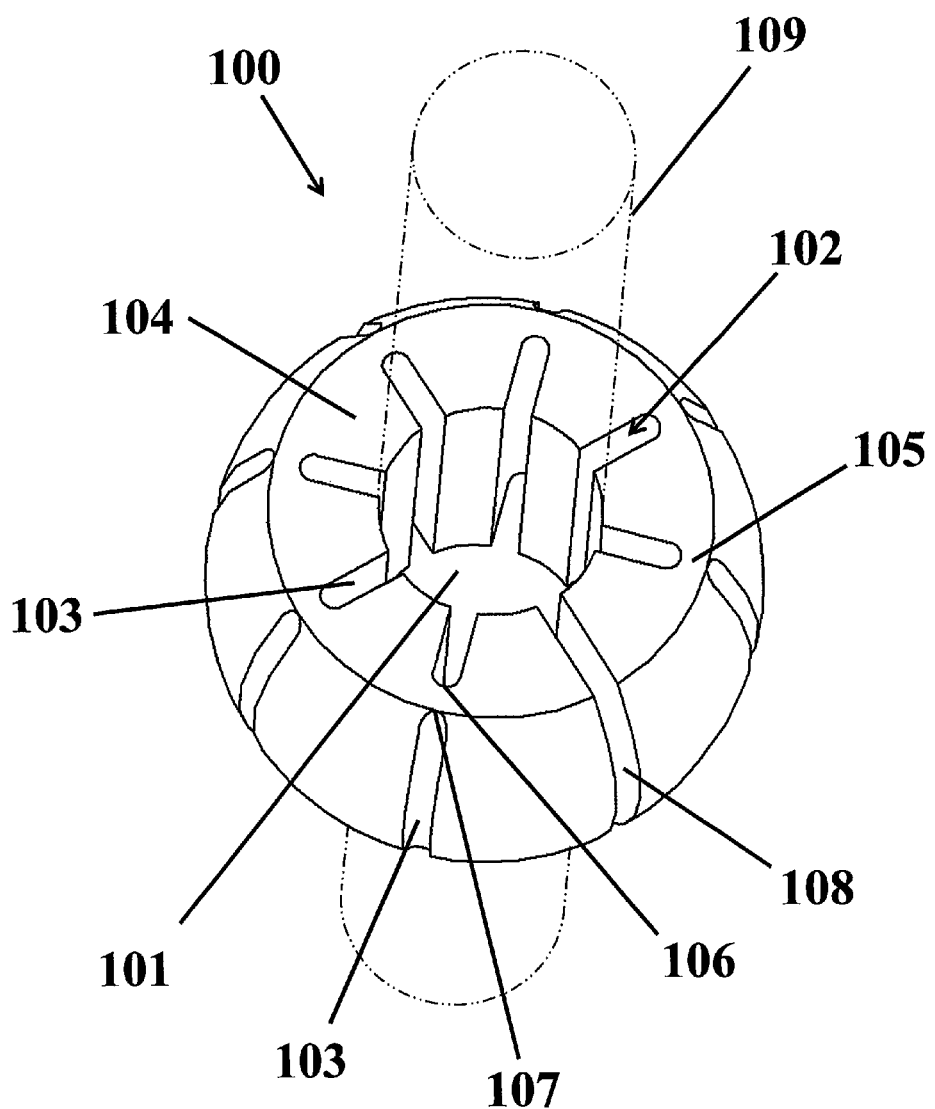
FIG. 1 is a spherical bearing core with a relief cut pattern.

FIG. 1 shows an embodiment of such a spherical core 100 providing an annular hole 101 through the center of the core 100 for securing to an example mounting shaft 109 that is round in shape, depicted with dotted lines to represent one possible attachment to the spherical core 100 according to the invention. As can be seen in FIG. 1, the core 100 is in the form of a truncated sphere 100. The truncated sphere 100 of FIG. 1 is truncated both on top and similarly on the bottom of the sphere 100. A truncated sphere is most commonly used for the core of the spherical bearing, and its depiction in FIG. 1 allows the structural modifications made to the sphere to be easily seen.

FIG. 1 shows one pattern 102 that can be used for the relief cuts 103 in the spherical core 100. Though not passing through the core from the annular hole to the outside of the core, the relief cuts 103 in the core 100 are made through the entire thickness of the core 100 from top to bottom so that both the inner and outer relief cut slot bottoms 106, 107 are substantially parallel to the axis of the annular hole 101 through the core 100. In the case of relief cut 108 the cut does pass through the core 100 from the annular hole 101 to the outside of the core 100 as shown in FIG. 1.

The pattern of relief cuts 102 creates a series of effective deflection flexure points 105 for the spherical core segments 104. The flexure points 105 are displaced from the centerline of the annular hole 101 such that pressure on the segments 104 will always cause them to deflect toward the shaft. This has several advantages among which are providing improved immobilization by uniform contact of the segments 104 with the shaft and permitting effective immobilization with minimal clamping pressure. Because the clamping pressure required can be minimal, the releasability of the core is also enhanced.

Figure 2:
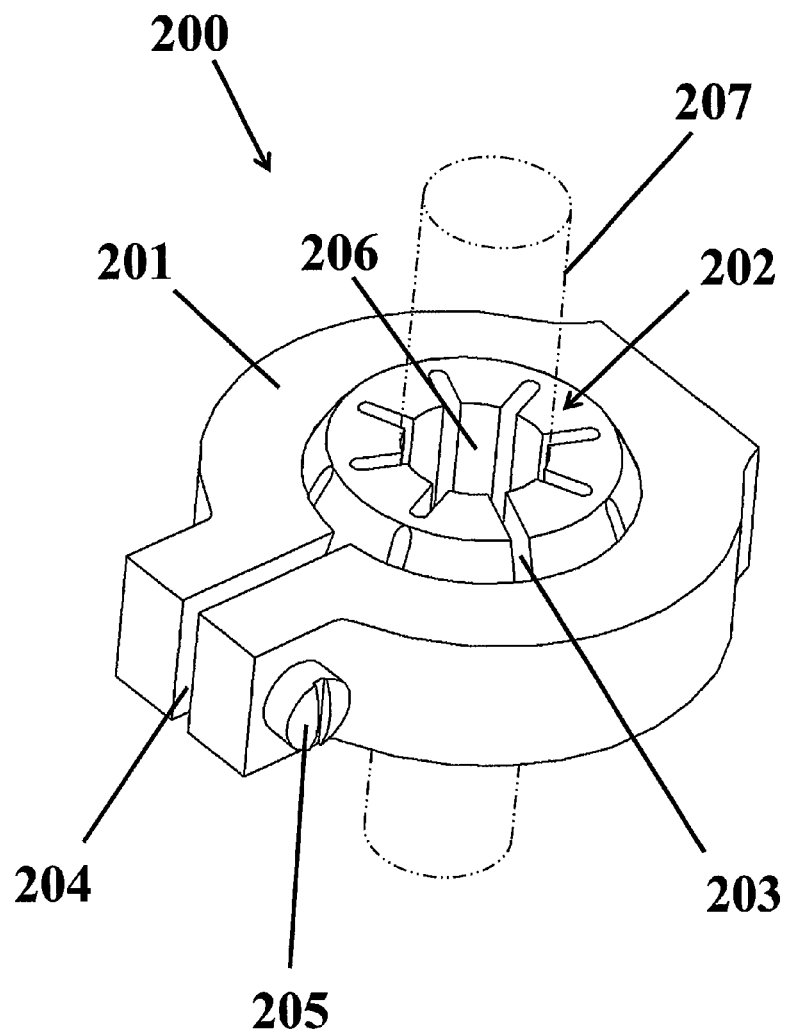
FIG. 2 is a spherical bearing comprising a bearing core in a bearing housing.

FIG. 2 shows a spherical bearing assembly 200 comprising an outer member or housing 201 where both the outer member or housing 201 and the inner member, the spherical core 202, are split 203, 204 on planes passing substantially through the centerline of the annular hole 206 by relief cuts. The relief cuts constitute structural modifications, and the term can apply to the housing as well as the core. The housing 201 is provided with a clamping mechanism 205 that, when tightened, will compress the spherical core 202 causing it to tighten on a shaft 207 passing through the annular hole 206 of the core 202. The resulting friction in the clamped components immobilizes the shaft in the core 202 and the core 202 in the housing 201 creating in effect a friction locked spherical joint. Unique to this design are a series of radial relief cuts in the core 202, passing substantially through the axis of the annular hole 206, that cause the core 202, when compressed, to deflect uniformly around the shaft regardless of the orientation of the split 203 in the core relative to the split 204 in the housing.

Figure 3:
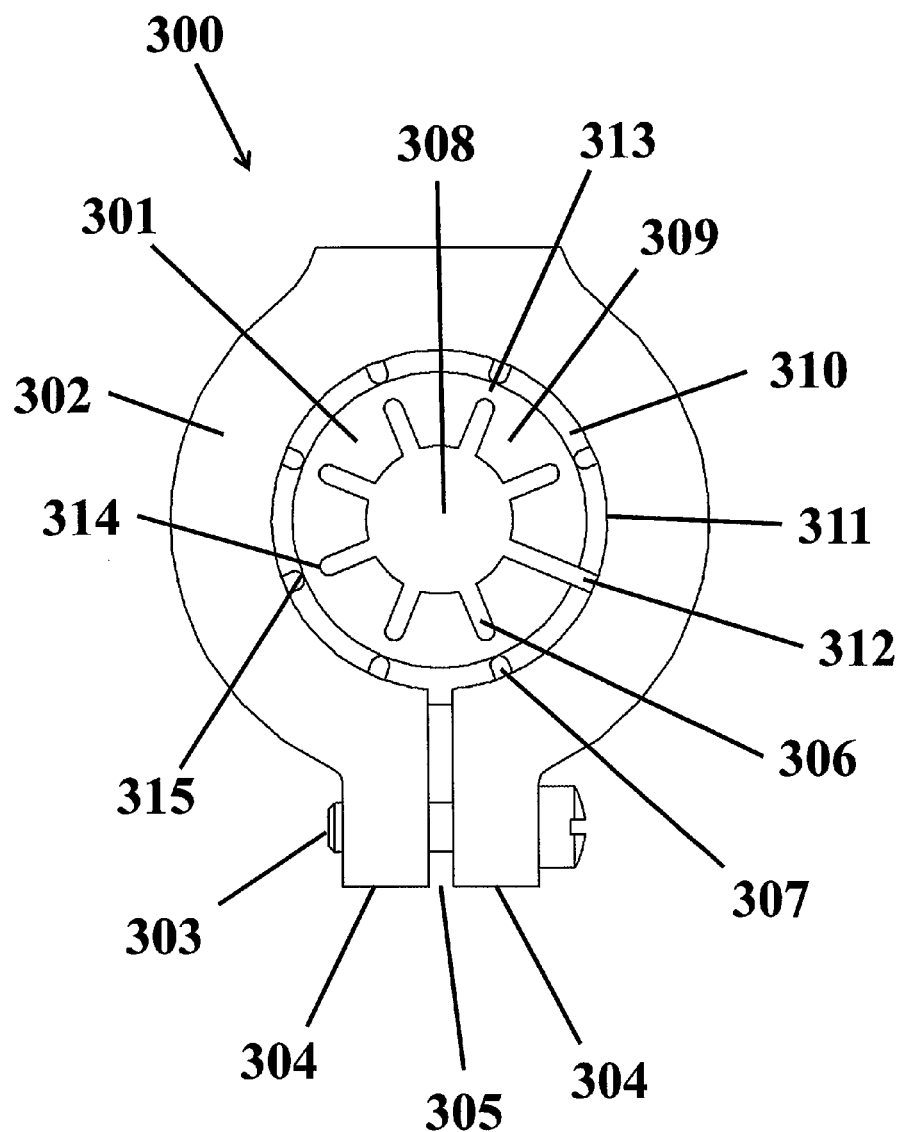
FIG. 3 is a spherical bearing with a screw disposed in the housing ears.

FIG. 3 is an embodiment of an assembled bearing assembly 300 showing a spherical core 301 encased in a bearing housing 302. In FIG. 3 the housing is clamped down by a screw 303 that runs through the ears 304 of the clamp housing and is threaded into one of the ears 304 providing, when tightened, the pressure on the ears 304 that is necessary immobilize the core 301.

Although in FIG. 3 a screw 303 is used to provide the force needed to close the housing 302 and render the core 301 immobile, any other sufficiently robust closing mechanism could be used to draw the housing together. For example, a bolt or a "C" clamp could be used to draw the ears 304 together.

As a further example, in a different embodiment the housing can be constructed without ears 304 but with one or more relief cuts splitting the housing. In this embodiment a strap clamp surrounding the housing can be used to compress the housing on the bearing core. When the clamping force applied is sufficient, the bearing is immobilized.

Returning to the FIG. 3 embodiment, the bearing housing 302 is solid except for the split 305 as shown. Nonetheless, the force provided by the closing mechanism 303, in this case a threaded screw 303, is sufficient to effectively immobilize the bearing when tightened and release the bearing when loosened.

In FIG. 3 the reader's attention is drawn to the arrangement of the relief cuts 306, 307. The inner relief cuts 306 substantially radiate out from the central annular hole 308 with a core split 312 also present to allow the core 301 to deform slightly when the housing 302 is tightened. The cuts 306 segment the inner core surface and the inner segments 309 so formed can engage the surface of a shaft passing through the annular hole 308 as the core 301 is deformed by the closing pressure caused by the bearing housing 302. In like manner the outer relief cuts 307 provide segments 310 that allow flexure of the core 301 and still allow the outer surface of the core 301 to engage the inner surface of the clamp housing 311 when the housing 302 is tightened.

One purpose of the relief cuts is to increase the flexibility of the core so that it can flexibly engage the shaft and the bearing housing 302 surface. The cuts 306, 307 also provide extra room inside the bearing assembly 300 for flexing to occur and minimize the closing force needed to immobilize the core 301.

In FIG. 3 the inner relief cuts 306 are opposite the outer relief cuts 307. Although such an arrangement is not necessary for the invention to successfully operate, making the relief cuts in this manner provides additional flexibility.

This pattern of relief cuts 306, 307 creates a series of effective deflection flexure points 313 for the spherical core segments 309, 310. The flexure points 313 are displaced from the centerline of the shaft bore 308, that is the annular hole 308, such that pressure on the segments 309, 310 will always cause them to deflect toward the shaft, and the deflection flexure points so formed will allow the spherical core 301 to accommodate minor variations in the shape of the central shaft used and in the shape of the bearing housing 302 while maximizing the contact surface area between the inner core segments 309 and the shaft and the outer core segments 310 and the housing 302. This provides improved immobilization by uniform contact of the segments 309, 310 permitting effective immobilization with minimal clamping pressure. Because the clamping pressure required can be minimal, the reliability and releasability of the bearing assembly 300 are enhanced.

Because the inner and outer relief cut bottoms 314, 315 are parallel with each other and with the annular hole 308 axis, from another perspective the effect of this arrangement is to provide a flexible cylindrical band that envelops within the core 301 and is defined by the outer ends 314 of the inner relief cuts 306 and the inner ends 315 of the outer relief cuts 307 and accommodates imperfections in the shaft (not shown in FIG. 3) or in the bearing housing 302.

Further, in the event a shaft is used that is not substantially round, the bearing assembly 300 can accommodate and maximize its ability to immobilize the shaft.

Figure 4:
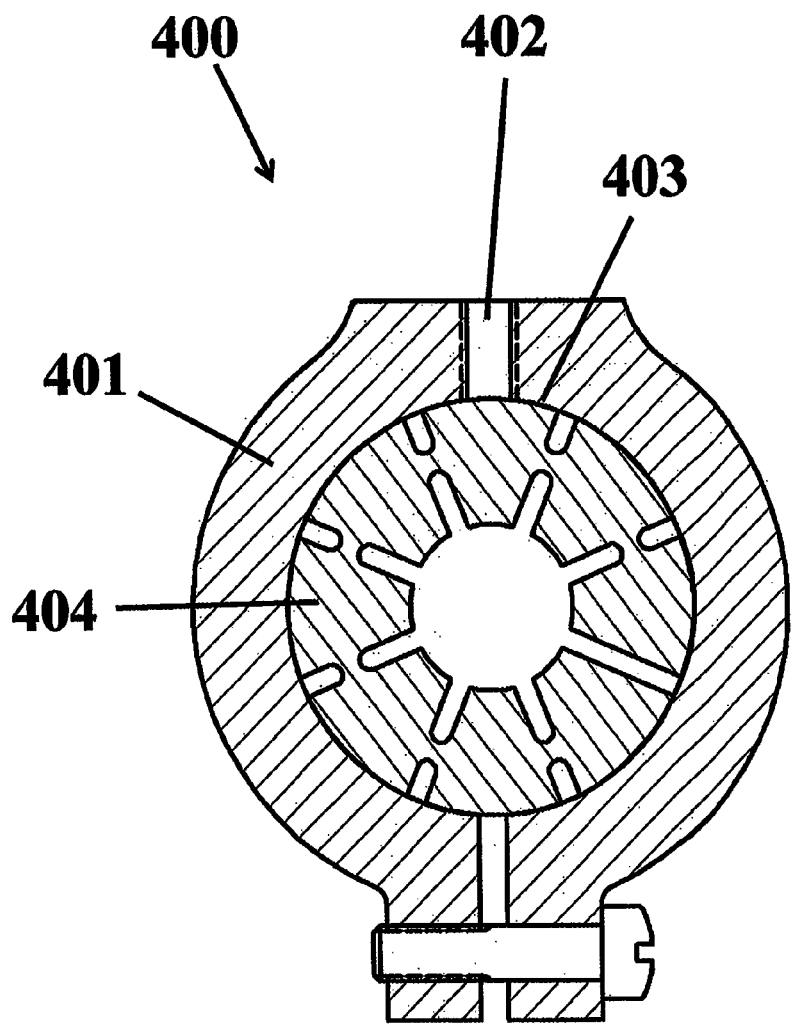
FIG. 4 is a spherical bearing comprising an attachment mounting hole in the housing.

In another embodiment FIG. 4 shows a bearing assembly 400 where the bearing housing 401 comprises a threaded mounting receptacle 402. This embodiment demonstrates how the bearing housing 401 could be modified to allow the assembled bearing 400 to be affixed to another piece of apparatus allowing the other piece of apparatus to be mounted on the bearing assembly 400 or allowing the bearing assembly 400 to be mounted on another piece of apparatus. In this way the bearing assembly 400 can be used to join two or more pieces of apparatus together. To do so one includes additional mounting receptacles.

As shown in FIG. 4 the mounting receptacle 402 runs through the bearing housing 401 and extends to the outer surface 403 of the bearing 404 and can be used, if needed, to help immobilize the bearing when a threaded apparatus actually contacts the surface of the core 403.

Figure 5:
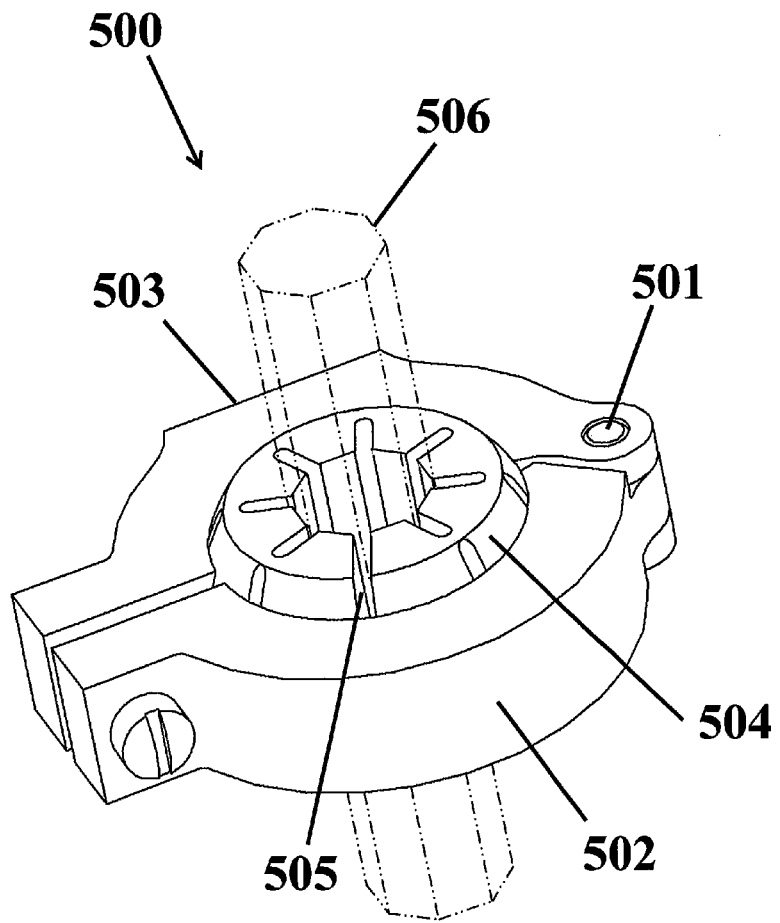
FIG. 5 is a spherical bearing with a hinged housing.

In yet another embodiment FIG. 5 shows a bearing assembly 500 where a hinge 501 comprises a part of the bearing housing 502. This is another example of the flexibility in design of which the invention is capable. FIG. 5 depicts a shaft 506 that is not round in shape, depicted with dotted lines to represent one possible interface with the bearing core 504 according to the invention.

In some applications it is necessary to assemble the bearing with the bearing housing at the point of use, as where fit or size place restrictions on the installation. FIG. 5 demonstrates an embodiment of this flexibility. In this embodiment the hinge 501 has been added so that if the bearing core 504 is already installed on a shaft 506, the housing 502 can be installed without the need to slide the housing 502 along the shaft 506. Rather, the housing 502 can be installed over the bearing core 504 from a position perpendicular to the shaft 506.

From another aspect the housing can be constructed in two parts and secured using two sets of ears similar to elements 304 shown in FIG. 3. An example of such an arrangement could be a pillow block that is mounted on a surface. The pillow block has a bearing core secured between the pillow block base on one side and the pillow block retainer on the other side. Both ends of the pillow block can be secured together with screws similar to the ear 304 and screw 303 arrangement of FIG. 3.

In embodiments where the bearing core 504 is made of sufficiently flexible material, the bearing core 504 can be slipped over a shaft, because the bearing core 504 is split 505. The housing 502 can then be installed over it even if the housing is made of non-flexible material. Such flexibility is very useful when the ends of a shaft are inaccessible, but a spherical bearing needs to be installed.

In another embodiment the core can be cut through as in drawing element 108 shown in FIG. 1 but in several different places, and the multi-piece core can be used to surround a shaft and can be held in place by the housing. The housing can then be clamped and tightened to releasably immobilize the bearing on a shaft.

In yet another embodiment the core can be hinged for placement around a shaft with a clampable housing placed over the hinged core to immobilize the bearing on the shaft.

Returning to the embodiment shown in FIG. 5, the side of the housing 502 is flattened 503 to allow the bearing 500 to be mounted on a flat surface. In other embodiments the housing can similarly be modified in many different ways to accommodate the practical needs of the application.

For example, in a different embodiment where space is limited the housing can be split into two or more pieces that can be assembled around a core and strapped together with a strap clamp. Tightening the strap clamp then compresses the housing around the core and can immobilize or free the bearing depending on how tightly the strap clamp is adjusted.

Figure 6:
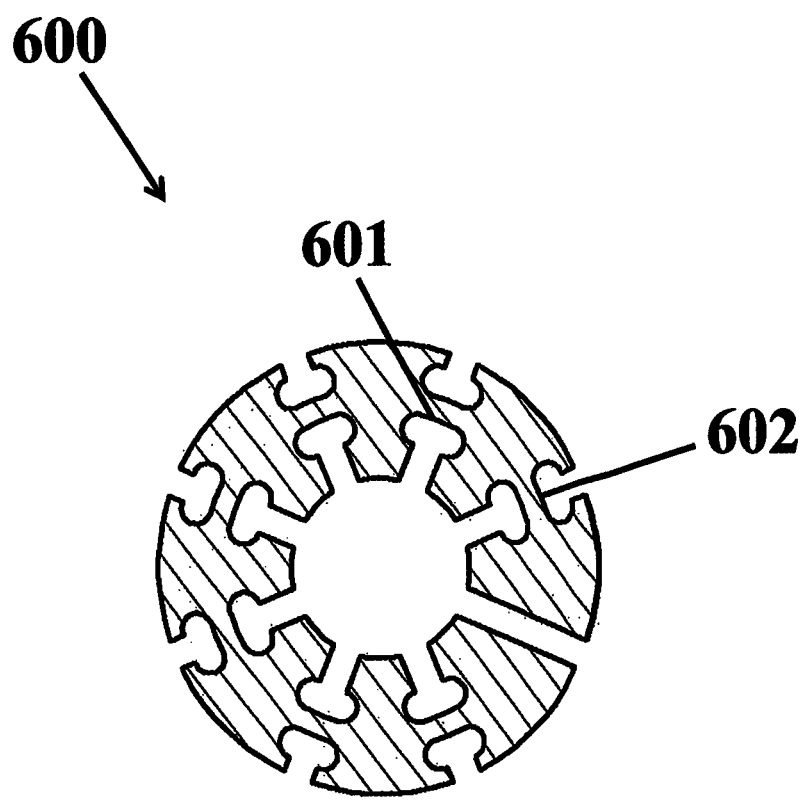
FIG. 6 is a spherical bearing core with structural modifications.

In yet another embodiment FIG. 6 shows how the spherical core 600 can be modified to provide enhanced flexibility and to enhance the banding effect discussed above in reference to FIG. 3. In this embodiment the outer ends of the inner relief cuts 601 and the inner ends of the outer relief cuts 602 are broadened to increase the flexibility of the spherical core. By choosing the design of the relief cuts, different properties of flexibility can be achieved and other effects such as enhanced band strength, deflection, flexure and shaft or housing contact pressure distributions can be achieved.

In other embodiments a bearing assembly can comprise different materials to modify the performance of the bearing assembly.

For example, different materials can be chosen to cause the bearing to provide more or less "lash." In one example a very flexible bearing material can be chosen to allow the bearing to absorb limited amounts of force when a torque is suddenly imposed on either a central shaft or the bearing housing.

In another embodiment, combinations of materials can be chosen to provide the contact surfaces of the inner segments and the outer segments different coefficients of friction thus allowing controlled slippage of the joint if desired. Additionally, the materials used for the bearing housing can also be chosen to provide specific frictional and/or torque response properties.

In another embodiment the surface finish of the annular hole and/or the spherical surfaces can be modified to provide specific frictional response. For example, the surfaces can be modified or coated to enhance frictional binding when the bearing is clamped.

Those skilled in the art will realize that this invention is capable of embodiments different from those shown and described. It will be appreciated that the detail of the structure of this apparatus and methodology can be changed in various ways without departing from the scope of this invention. Accordingly, the drawings and detailed description of the preferred embodiments are to be regarded as including such equivalents as do not depart from the scope of the invention.

I claim:

1. A spherical bearing for releasably immobilizing an attachment to a shaft comprising:
    a truncated spherical core comprising opposing top and bottom surfaces connected by a spherical outer periphery, and further comprising an annular hole through the center of the core for appending the core to the shaft, the core comprising:
        a plurality of segments positioned radially around the annular hole, the segments defined by a plurality of outer relief cuts formed in the spherical outer periphery, and a plurality of inner relief cuts formed around the annular hole, the outer and inner relief cuts being circumferentially aligned with each other, and extending between the top and bottom surfaces of the core; and
        a plurality of deflection flexure points, each point formed radially between a pair of circumferentially aligned outer and inner relief cuts in the core;
    a flexible housing surrounding the spherical core; and
    a releasable clamping mechanism for radially clamping the flexible housing to compress the spherical core, the clamping mechanism being positioned to reduce the diameter of the flexible housing when the clamping mechanism is tightened to cause the segments to deflect about the deflection flexure points and conform to the outer surface of the shaft, thereby immobilizing the core on the shaft and immobilizing the housing on the core;
    the spherical core having a spherical core diameter and the shaft having a shaft diameter wherein the ratio of said spherical core diameter to said shaft diameter is greater than about 1.5.

2. The spherical bearing of claim 1 where the attachment is mounted on the spherical bearing.

3. The spherical bearing of claim 2 where the attachment can be positioned by holding the attachment in the desired position and can be immobilized by tightening a single clamp on the housing.

4. The spherical bearing of claim 1 where a relief cut splits the spherical core between the annular hole and the spherical outer periphery of the core to increase the flexibility of the core when it is compressed by the housing.

5. The spherical bearing of claim 4 where at least one relief cut splits a side of the housing, the at least one relief cut providing space to compress the housing and immobilize the bearing.

6. The spherical bearing of claim 5 where the bearing is positioned to engage the shaft with said spherical core such that said bearing, when in engagement with the shaft, can immobilize the shaft at different positioned alignments of the relief cuts passing through the core, the different positioned alignments being relative to the housing.

7. The spherical bearing of claim 1 where the flexure points are displaced from the annular hole such that pressure applied by the housing on the segments causes the segments to deflect toward the shaft to provide uniform contact of the segments with the shaft.

8. The spherical bearing of claim 1 where the core and the housing are modified with relief cuts to maximize immobility when the bearing is clamped on a shaft regardless of the orientation of core relief cuts relative to the housing relief cuts.

9. The spherical bearing of claim 1 where the annular hole of the spherical core is shaped to engage and conform to a shaft that is round.

10. The spherical bearing of claim 1 where the annular hole of the spherical core is shaped to engage and conform to a shaft that is not round.

* * * * *